United States Patent Office 3,010,673
Patented Nov. 28, 1961

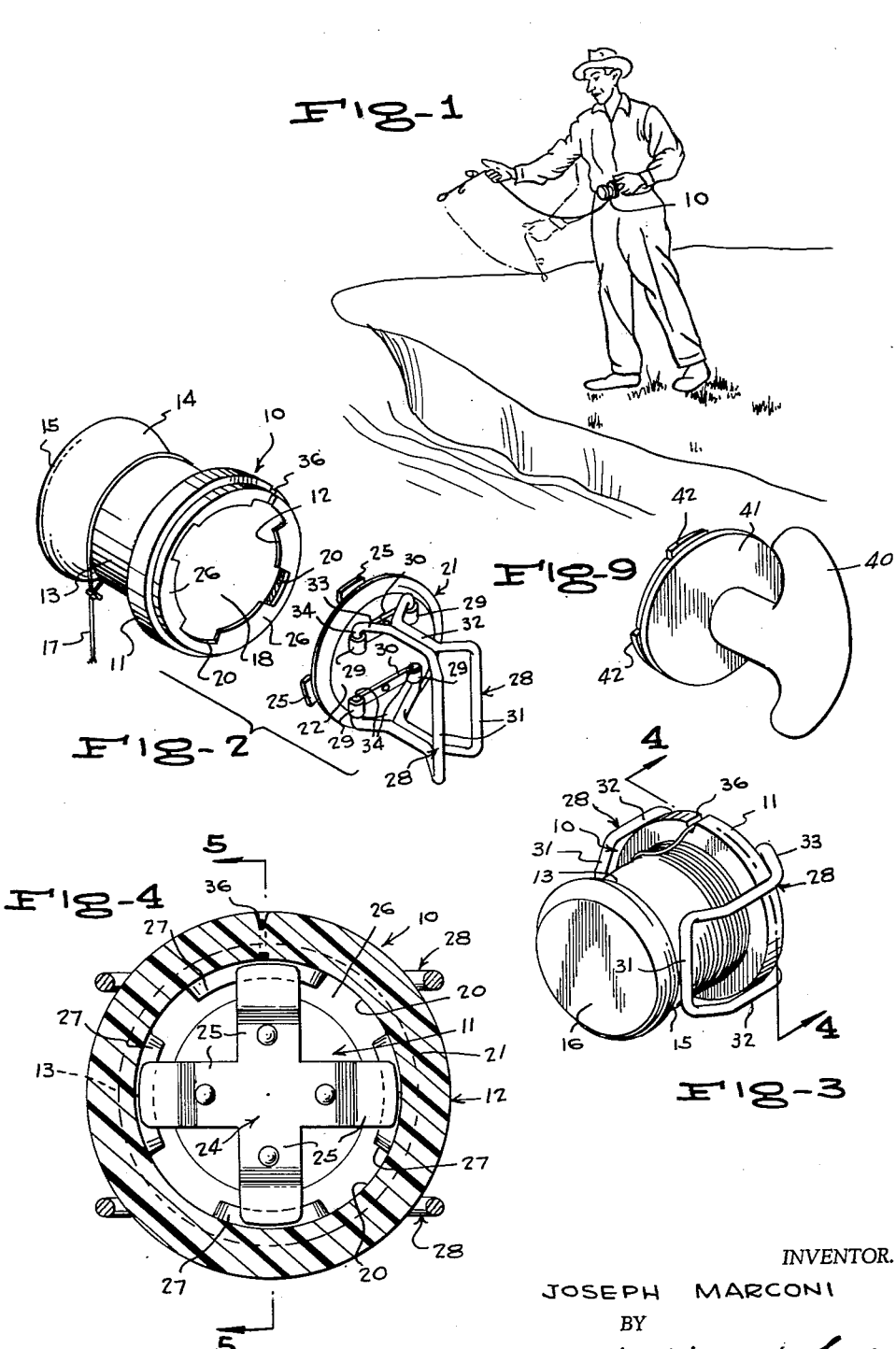

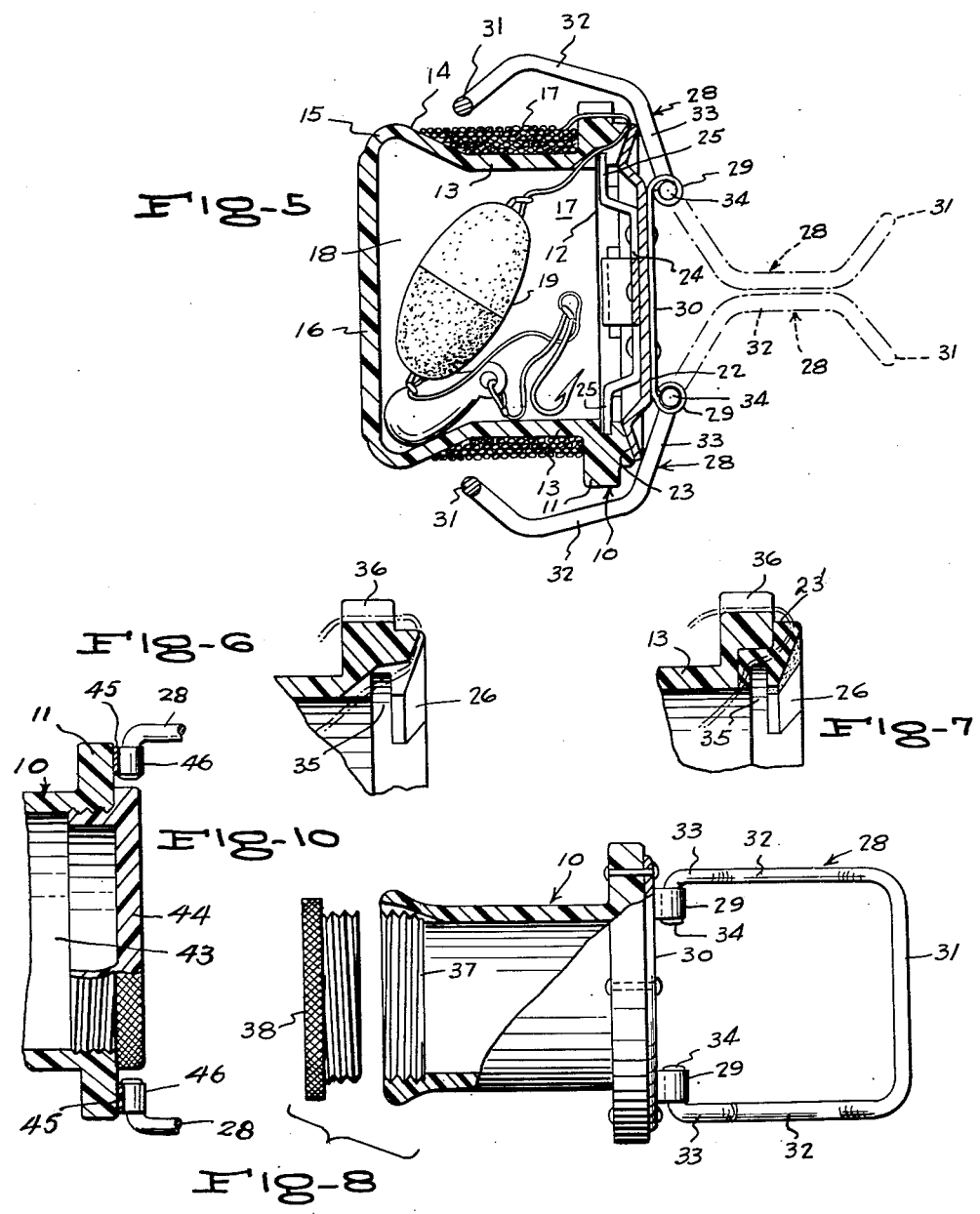

3,010,673
HAND FISHING REEL
Joseph Marconi, 414 Stark Ave., Johnson City, N.Y.
Filed Jan. 29, 1959, Ser. No. 789,889
3 Claims. (Cl. 242—85.1)

This invention relates to a hand fishing reel and it consists in the constructions, arrangements and combinations herein described and claimed.

It is the cardinal object of the invention to provide a hand fishing reel in which a hollow spool-like body is employed upon which the fishing line is wound, the spool body having a handle at one end, while the opposite end or forward portion is formed with an outwardly, arcuate shaped annular shoulder insuring retention of the line upon the spool body, yet permitting smooth unraveling of the fishing line from the reel when the line is cast.

More specifically, it is an important object of the invention to provide a hand fishing reel which is formed in two parts, namely a hollow spool reel body and a detachable handle thereby forming a compartment in which fishing accessories may be stored, the connection between the two parts being water tight rendering the reel non-sinkable.

It is also an important object of the invention to provide a novel detachable connection between the hollow spool body and the handle, the spool body having an annular exterior rim provided with a V-shaped notch for securely wedging the fishing line therein, as well as having a line entrance slot opening upon the interior of the compartment permitting storage of a portion of the line within the compartment, and providing a suitable gasket between the reel body and the handle, thereby providing a water tight connection between the two parts.

It is a still further object of the invention to provide a hand fishing reel, wherein he handle thereof is of a collapsible or folding type, embodying a pair of hingedly mounted hand grips cooperating to form a single grip in one position, yet foldable in such manner as to occupy a position overlying the reel spool, reducing storage space in shipment, as well as in a fisherman's kit.

Additional objects, advantages and features of invention will be apparent from the following description, considered in conjunction with the accompanying drawings, wherein, FIGURE 1 is a perspective view of a fisherman in the act of casting the fishing line.

FIGURE 2 is a perspective view of the reel with the handle in separated relation.

FIGURE 3 is a perspective view of the assembled reel, with the handle in collapsed position.

FIGURE 4 is an enlarged cross section taken on the line 4—4 of FIGURE 3.

FIGURE 5 is a cross section taken on the line 5—5 of FIGURE 4.

FIGURE 6 is a fragmentary cross section of the reel, illustrating a slot for accommodation of the fishing line, when a portion thereof is stored within the compartment of the reel.

FIGURE 7 is a similar view illustrating a sealing means between the closure of the handle and the reel body.

FIGURE 8 is an exploded side elevation, partly in section, of a modified form of the reel, and FIGURE 9 is a perspective view of a modified form of handle which may be employed with the reel.

FIGURE 10 is a fragmentary section of the rear end of the body member, illustrating a further form of the reel.

There is illustrated a hand reel generally indicated by the reference character 10 which may be formed from any suitable material, but preferably molded from a suitable plastic material. The body is of cylindrical formation having an exterior flange 11 circumscribing the open end 12, the integral reel wall 13 being extended at right angles to the flange for a distance and then being upwardly and outwardly inclined as at 14 and thence rounded as at 15 and forming a juncture with the forward wall 16 of the spool body. There is thus formed a spool portion of a diameter less than the flange 11 and the forward wall 16 upon which the fishing line 17 may be wound.

As best seen in FIGURES 2 and 5, the reel body is hollow forming a housing or compartment 18 for storage of a portion of the fishing line 17 and accessories associated therewith, as indicated at 19. Suitably spaced upon the interior periphery of the flange 11, openings or arcuate slots 20 are formed, concentric with the open end 12 of the reel body, these slots providing a means for securing a combined closure and handle for the reel, as will now be described, reference being had particularly to FIGURES 2, 4 and 5 of the drawings.

The combined closure and handle is generally indicated by the reference character 21 and consists of a circular plate of a diameter less than the interior diameter of the flange 11 adapted to snugly abut a seat 23 of the flange, as best seen in FIGURE 5. Upon the inner face of the plate 22 an attaching means 24 is secured by rivets or otherwise, the attaching means including, in the present instance, four radially extended clip arms 25 which are complementary to a like number of slots 20 formed in the flange. The terminal ends of the arms 25 are outwardly offset a distance slightly less than the thickness of the surfaces 26 between the slots 20, the ends of the surfaces 26 being tapered as at 27, so that when the closure 21 is presented with the arms 25 positioned in respective slots 20, a partial rotation of the closure will cause the arms to pass behind the surfaces 26 to secure the closure in water-tight position within the open end of the reel 10.

The closure 21 comprises a pair of arms 28 swingably mounted in bearings 29 integral with a plate 30 secured to the outer face of the plate 22. The arms 28 are each formed from a strand of wire of proper gauge, which is bent intermediate the length thereof to define a bight portion 31 disposed at an angle to a straight portion 32, from which the wire is then bent at an angle to form a portion 33 approximately at the same angle as the portion 32, the portion 33 terminating in pivot portions 34 for securement in respective bearings 29. The handle members 28 are thus shaped and so pivoted as to be swingable to an operative position, the bight portions 31 being aligned forming a hand grip means as shown in FIGURE 2, or the members 28 may be swung into positions overlying the reel body, as in FIGURES 3 and 5.

It is contemplated that a water-tight connection between the seat 23 and the closure plate 22 can be readily effected. However, to further insure such a connection between the reel and handle, a sponge rubber gasket 23' may be secured within a rabbeted seat 35, as clearly shown in FIGURE 7.

In order that the fishing line may be accommodated within the compartment 18, the flange 11 is provided with a V-shaped notch 36 permitting passage of the line therein and into the open end of the compartment, and by virtue of the reduced size of the notch at the bottom thereof, the line will be positively held against accidental loosening.

In FIGURE 8, the reel 10 is formed with an open front end 37 which is interiorly threaded for receiving a closure cap 38, and obviously, if desired, a suitable gasket may be employed to effect a water tight connection, the hand grip being constructed as previously described.

The handle and closure 21 may be formed as an integral unit 40 as shown in FIGURE 9, the closure 41 having integral lugs 42 which are complemental to respective slots 20 of the open end of the reel.

A further form of the reel and handle is illustrated in FIGURE 10, wherein the reel body 10 is formed with an opening 43 in the rear flange and wall 11 thereof providing access to the compartment 18 of the reel. A cap 44 is employed to close the open end of the compartment, and may embody screw threads as shown, or the cap may have a snap fit within the opening, as desired. The handles 28 are constructed as previously described, but in this instance, the plates 45 have bearings 46 for pivotal support of the handles and are secured to the flange 11 by means of rivets or the like.

The peripheral edge of the flange 11 may be formed with a V-notch and the periphery of the opening 43 may have a notch in alignment with the V-shaped notch of the flange permitting passage of a fishing line within the compartment. In this form of the reel, the closure cap 44 may be removed or replaced independently of the handles 28.

The operation of the reel is substantially as follows: The fisherman grasps the handle 28 in one hand and with the other hand casts the line with the hook and sinkers connected to the line in the usual manner. The fishing line 17 will unwind from the reel body in orderly fashion by partaking of circumferential movement about the circular arcuate shoulder 15, thus avoiding possibility of tangling or otherwise fouling of the line.

The fishing line may be readily re-wound upon the reel body when desired, and a portion of the line together with the hook and sinker or other accessories associated with the line may be readily stored within the compartment 18 after removal of the combined closure and handle; and the line portion wound upon the reel may be retained in such position, by passing the line into the V-shaped notch 36. The combined closure and handle may then be returned to and secured in the open end of the reel body. The hand grips 28 may then be swung to collapsed positions upon the wound line, as shown in FIGURES 2 and 5, for storage in a kit or otherwise.

While I have shown and described preferred forms of the reel, this is by way of illustration only, and I consider as my own, all such modifications in construction as fairly fall within the scope of the appended claims.

I claim:

1. In a hand fishing reel, a spool-like body member of hollow formation having an open rear end, a combined closure and handle detachably connected to said open rear end, said closure having circumferentially spaced tongues, the forward end of said body member having a closed end, the outer periphery of said closed forward end having a contour which is outwardly and arcuately flared forming a smooth rim for circumferential passage therearound of a fishing line during casting thereof, the inner periphery of the open end of said spool-like body member being provided with spaced slots for reception of respective tongues of the closure, whereby a partial rotation of said closure with respect to said body will effect a tight connection therebetween and said handle comprising separate grip members pivotally connected to the exterior of said closure and separately movable to occupy an inoperative position overlying the body of the spool-like body member.

2. In a hand fishing reel, a spool-like body member of hollow formation having a closed end and an open end, a combined closure and handle member detachably connected to said open end, a fishing line connected to said spool-like body member, an annular integral flange exteriorly of said open end and spaced from the closed end of said spool-like body member, said flange having a V-shaped notch for reception of the line at times, the closed end having an outer peripheral contour which is outwardly and arcuately flared forming a smooth annular rim for circumferential passage of the fishing line when said line is cast in the direction of the closed end, and said handle comprising a pair of hand grips pivotally connected to the exterior of the closure and movable to a position to form a unitary handle and further being individually movable to occupy a position upon opposite sides of the spool-like body member.

3. In a hand fishing reel, a hollow spool-like body member having a forward closed end and an open rear end, a watertight closure for said open rear end forming a storage compartment within the body member, said open rear end having a circumscribing integral flange for seating engagement of said closure, said closure having a plate mounted on the exterior surface thereof, said plate having bearing members, a hand grip pivotally mounted in each of the bearing members of said plate, said hand grip members being swingable to a position overlying said spool-like body member and to a position extended rearwardly of said closure, the closed forward end of said spool-like body member having a peripheral contour which is outwardly and arcuately flared forming a smooth surface for circumferential passage of a fishing line on the reel when cast in the direction of said forward closed end.

References Cited in the file of this patent

UNITED STATES PATENTS

| D. 171,880 | Bellinger | Apr. 6, 1954 |
| 588,355 | Reilley | Aug. 17, 1897 |
| 1,990,705 | McMillan | Feb. 12, 1935 |
| 2,808,043 | Lombard | Oct. 1, 1957 |

FOREIGN PATENTS

| 1,082,175 | France | June 16, 1954 |
| 139,492 | Sweden | Mar. 10, 1953 |